Aug. 5, 1958 J. E. GUTRIDGE 2,845,878
FREIGHT VEHICLE STAND
Filed Aug. 17, 1953 4 Sheets-Sheet 1
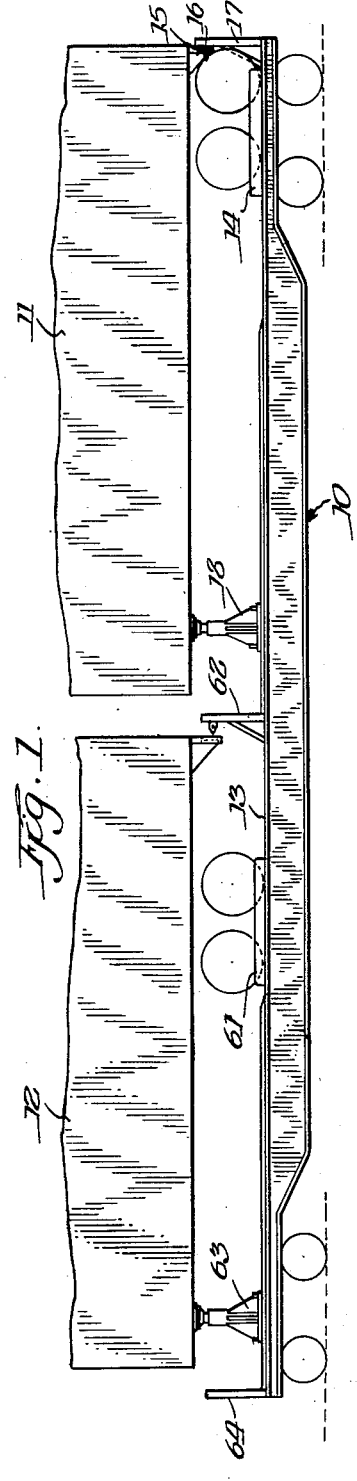
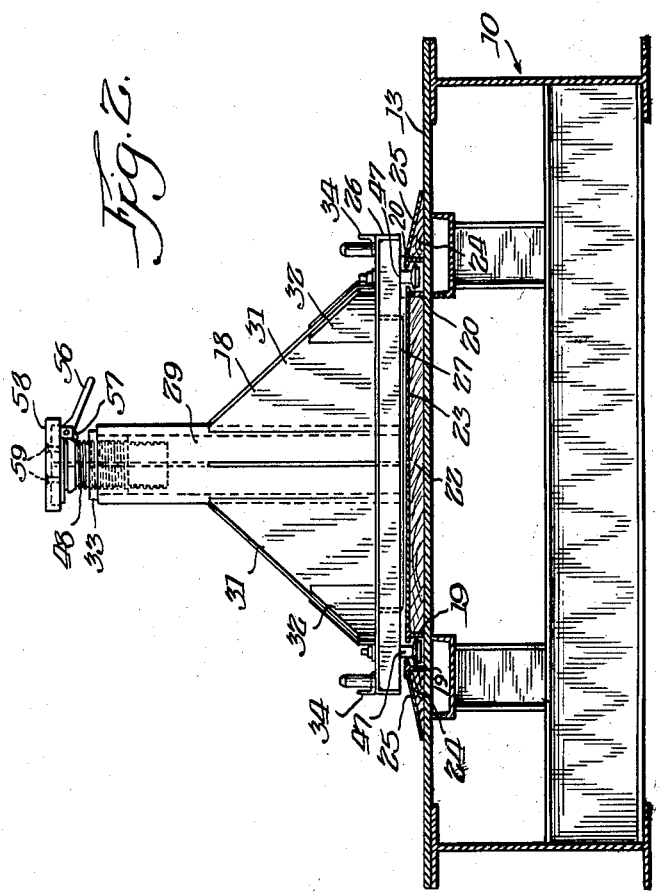
Inventor.
Jack E. Gutridge.
By Wayne Morris Russell.
Atty Aug. 5, 1958     J. E. GUTRIDGE     2,845,878
FREIGHT VEHICLE STAND
Filed Aug. 17, 1953     4 Sheets-Sheet 2
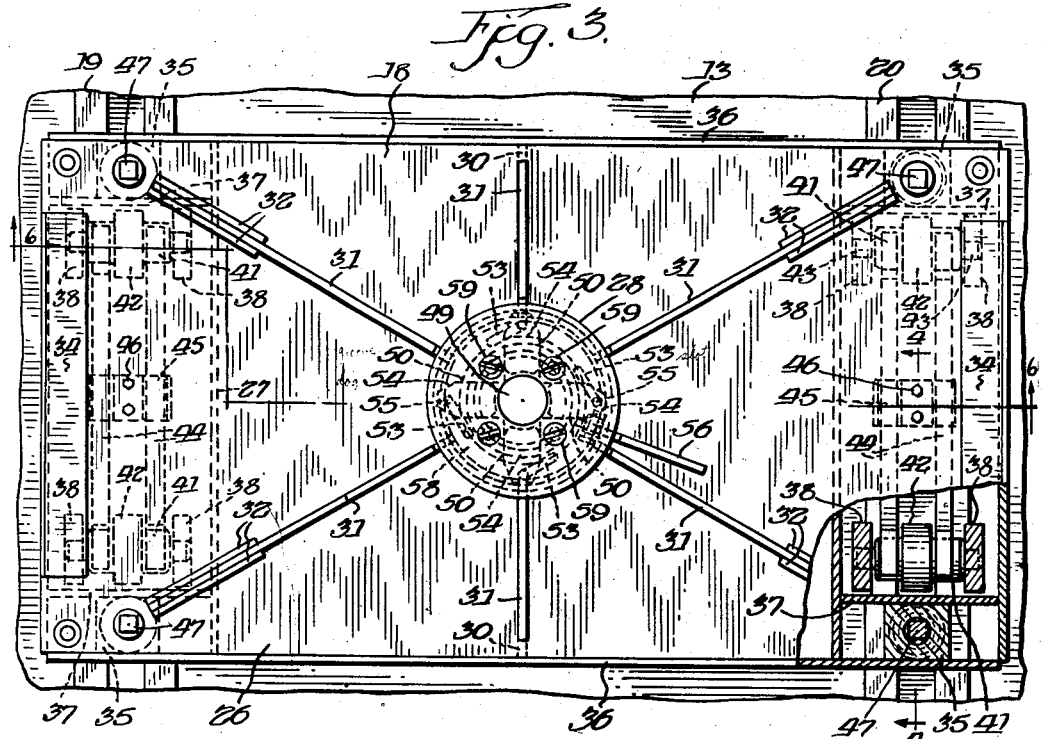
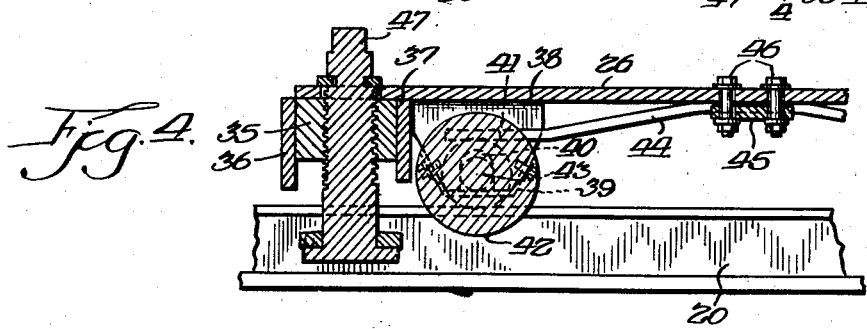
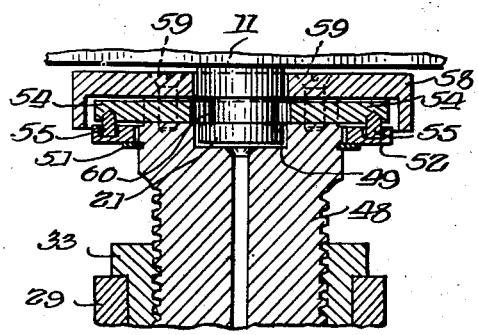
Inventor
Jack E. Gutridge.
By Wayne Morris Russell
Atty.

Aug. 5, 1958  J. E. GUTRIDGE  2,845,878
FREIGHT VEHICLE STAND
Filed Aug. 17, 1953  4 Sheets-Sheet 3
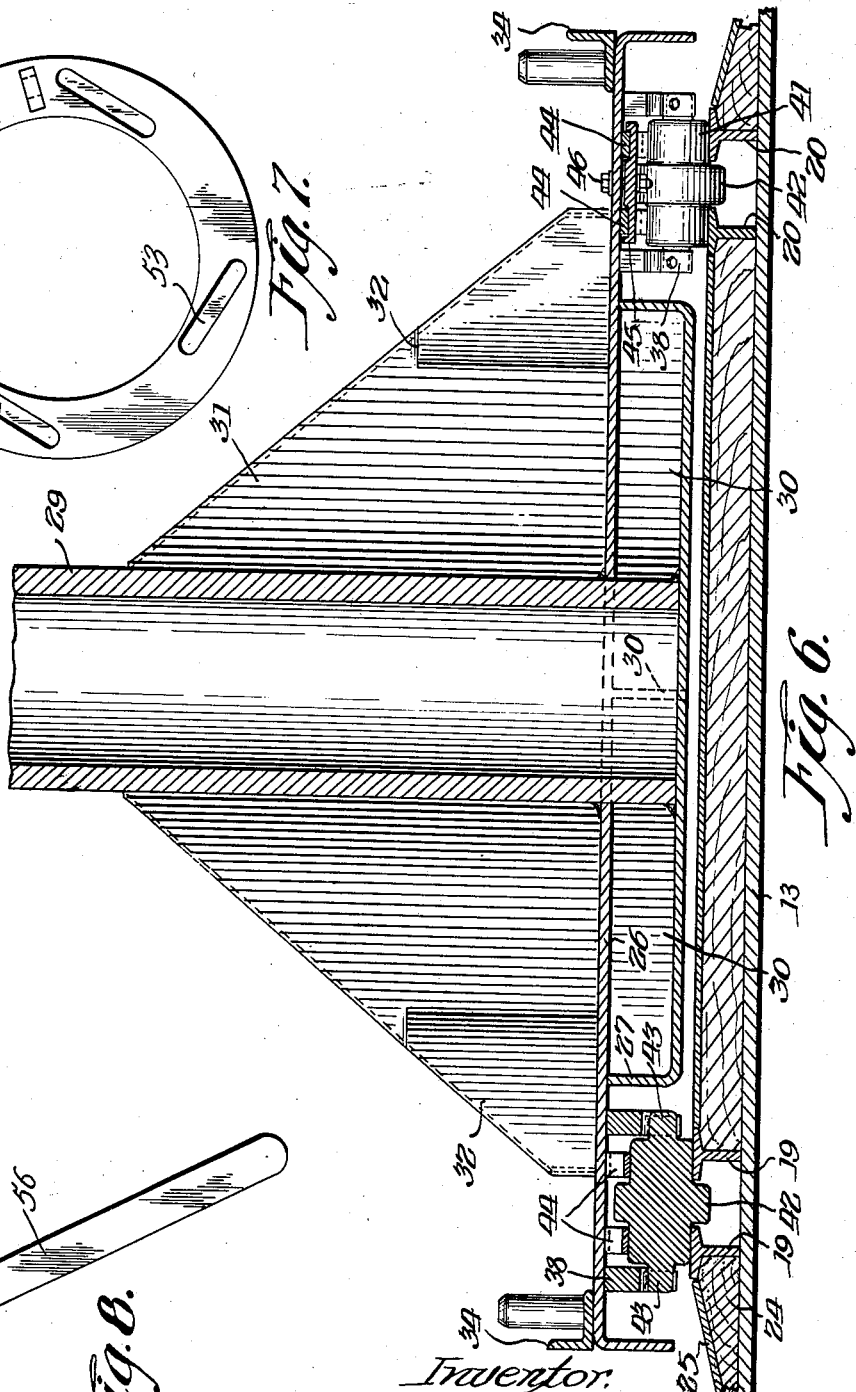
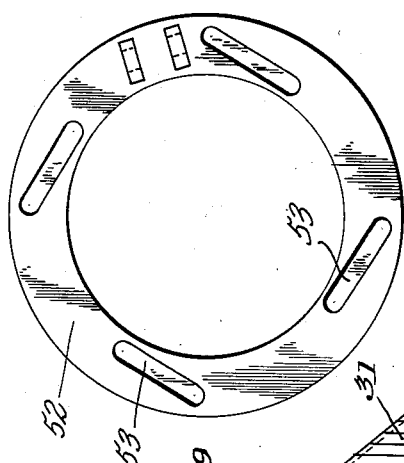
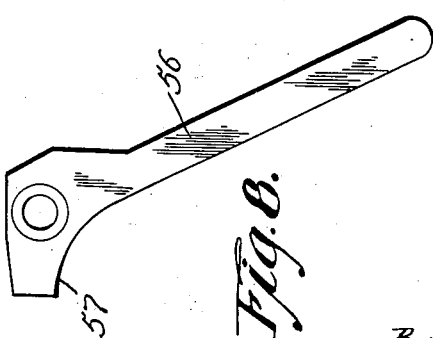
Inventor:
Jack E. Gutridge,
By Wayne Morris Russell
Atty.

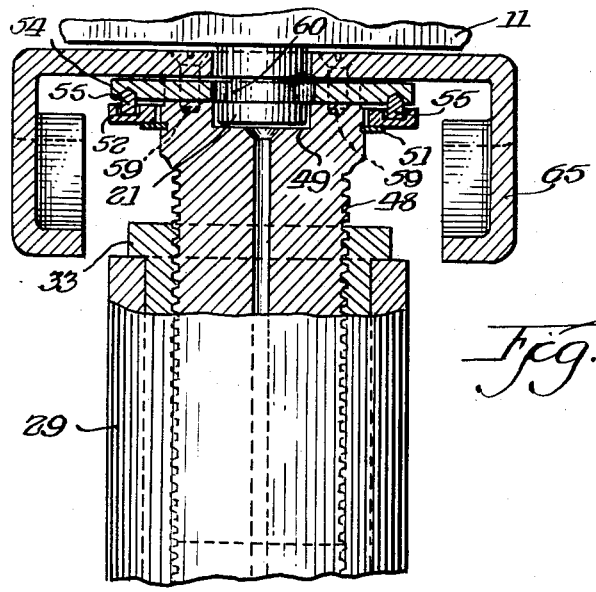
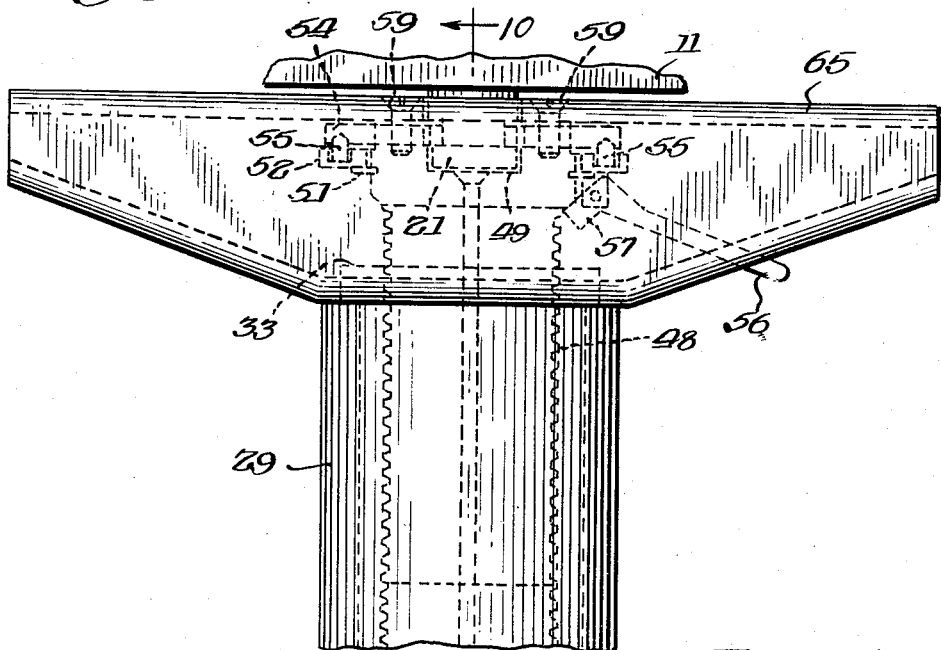
Inventor.
Jack E. Gutridge.
By Wayne Morris Russell
Atty.

United States Patent Office 2,845,878
Patented Aug. 5, 1958

2,845,878

FREIGHT VEHICLE STAND

Jack E. Gutridge, Munster, Ind., assignor to Pullman-Standard Car Manufacturing Company, Chicago, Ill., a corporation of Illinois Application August 17, 1953, Serial No. 374,759

6 Claims. (Cl. 105—368)

This invention relates to freight vehicles and is primarily concerned with a stand for partially supporting a vehicle to be transported on the freight vehicle.

The principal object of the invention is to provide a stand for partially supporting a vehicle to be transported on the freight vehicle.

Another object of the invention is to provide a freight vehicle stand which will prevent movement of the shipped vehicle vertically, transversely or longitudinally of the freight vehicle while in transit.

Another object of the invention is to provide a stand which is movably mounted on the freight vehicle so that it may be properly positioned under the vehicle to be transported.

A further object of the invention is to provide a freight vehicle stand which is vertically adjustable according to the height of the vehicle to be transported.

A further object of the invention is to provide a stand which is movably mounted on the freight vehicle and has means engageable with the freight vehicle to hold the stand in a fixed position while the shipped vehicle is being transported.

An important object of the invention is to provide a mechanism on a freight vehicle stand which is adapted to grip the fifth wheel pin on a truck trailer adapted to be transported on the freight vehicle.

A more specific object of the invention is to provide a freight vehicle stand adapted to move on rails on the floor of the vehicle allowing the operator to position the stand under a truck trailer to be transported and having means to make the stand vertically adjustable according to the height of the trailer and means engageable with the rails to hold the stand in a fixed position after it has been positioned under the trailer and having locking means adapted to grip the fifth wheel pin on the trailer.

The foregoing and other objects of the invention are attained by the construction and arrangement illustrated in the accompanying drawings wherein:

Figure 1 is a side elevational view of a railway flat car with two truck trailers loaded on the car and showing the fifth wheel stands for supporting the front ends of the trailers;

Figure 2 is a transverse cross sectional view through the car at the fifth wheel stand located adjacent the center of the car and showing the T-shaped rails on which the stand moves;

Figure 3 is a top plan view of one of the fifth wheel stands and the adjacent portion of the car;

Figure 4 is a cross sectional view taken on the line 4—4 of Figure 3 showing one of the wheels on the fifth wheel stand slidably disposed in vertically extending slots with one of the leaf springs urging the wheel downwardly and showing one of the screws which are adapted to hold the stand in a fixed position;

Figure 5 is a vertical sectional view through the top portion of the jack screw on one of the fifth wheel stands with a trailer fifth wheel pin being seated in the top portion of the screw and showing the mechanism for holding the fifth wheel pin;

Fig. 6 is a vertical sectional view taken on the line 6—6 of Fig. 3 with the top portion of the stand being omitted.

Fig. 7 is a bottom view of the locking ring and handle support means of the fifth wheel pin holding mechanism;

Fig. 8 is a side view of the handle of the fifth wheel pin holding mehanism;

Fig. 9 is a view of the top portion of the jack screw showing a modified arrangement; and Fig. 10 is a cross sectional view of the arrangement taken on the line 10—10 of Fig. 9.

The invention proposes a stand for partially supporting a vehicle to be transported on a freight vehicle. Rails extend longitudinally of the freight vehicle and are secured to the floor thereof. Wheels are mounted in slots in the stand and are adapted to roll on the rails so that the stand can be properly positioned under the shipped vehicle. Springs are carried by the stand and urge the wheels downwardly in their slots. A vertically disposed jack screw is carried by the stand so that the stand is vertically adjustable according to the height of the vehicle to be carried. A plurality of locking dogs are mounted in the top of the jack screw and are adapted to move inwardly to grip an attachment carried by the shipped vehicle. Securing elements carried by the stand are adapted to engage the rails to hold the stand in a fixed position while the shipped vehicle is in transit.

In the drawings, 10 generally designates a freight vehicle or railway flat car having the usual side sills here shown as I-beams and adapted to carry two vehicles or trucks trailers 11 and 12. The railway flat car is adapted to be loaded at a railroad terminal where it is brought between platforms which are substantially on a level with the floor 13 of the car. The trailers 11 and 12 are delivered to the railroad terminal by truck tractors and are left on the platforms on opposite sides of the car ready to be loaded on the car. Lift trucks are used to load the trailers 11 and 12 on the car and these lift trucks are of the type that are movable both longitudinally and laterally of themselves. Each trailer has eight rear wheels, that is, a first pair of wheels are disposed in front of a second pair of wheels at one side of the trailer and a third pair of wheels are disposed in front of a fourth pair of wheels at the other side of the trailer. To load the trailer 11 on the car the lift truck lifts the front end of the trailer off the platform on one side of the car and backs the rear end of the trailer onto the car and directs the wheels at one side of the trailer onto a channel-shaped turntable 14 which is pivotally mounted at its center to the floor 13 adjacent one side and one end of the car. The lift truck then moves the front end of the trailer 11 onto the car with the wheels at one side of the trailer pivoting with the turntable 14 while the wheels at the other side of the trailer roll on the floor 13 of the car. Although the trailer 11 is now entirely on the car it is still spaced from the end of the car. The lift truck then backs the trailer 11 longitudinally of the car until a horizontal channel 15 having spaced openings receives projections 16 on a vertically disposed support 17 fixedly mounted on one end of the car. A fifth wheel stand 18 is then moved longitudinally of the car on tracks 19 and 20 until it is directly under the fifth wheel pin 21 on the trailer 11. The lift truck then lowers the front end of the trailer 11 until the fifth wheel stand 18 receives the fifth wheel pin 21. The lift truck then backs off the car onto the platform at one side of the car.

The pair of spaced T-shaped tracks 19 are positioned longitudinally of the car and are secured to the floor 13 of the car and the pair of spaced T-shaped tracks 20 are positioned longitudinally of the car and are spaced from the tracks 19 and are secured to the floor 13 of the car. The tracks 19 and 20 extend from the center of the car to a location spaced from the turntable 14. A wood filler 22 is disposed between the tracks 19 and 20 and a cover plate 23 is disposed on the wood filler and extends between the tracks 19 and 20 and the plate and the filler are bolted to the floor 13 of the car by bolts which extend through the plate and the filler and the floor. Wood fillers 24 are disposed at the outer sides of the rails 19 and 20 and ramp plates 25 disposed at an angle extend between the adjacent flanges of the rails and the floor 13 and are welded to the rails and the floor.

The fifth wheel stand 18 is made up of an inverted channel-shaped plate 26 and a channel-shaped plate 27 has a lesser width than the plate 26 and has its flanges parallel to and spaced from the flanges of the plate 26 and the flanges of plate 27 are welded to the web of the plate 26 as best shown in Figs. 3 and 6. The plate 26 has an opening 28 in its web and centrally of the web and a vertically disposed tube 29 is disposed in the opening and has one end bearing against and welded to the web of plate 27 and the tube is welded to the walls of the opening in plate 26 as best shown in Fig. 6. Six stiffener plates 30 are positioned between the webs of the plates 26 and 27 and are arranged in radially spaced relation around the tube 29 and all of the stiffener plates have one end welded to the tube and two of the stiffener plates project toward and terminate at the nonflanged edges of the webs of plates 26 and 27 while the other four stiffener plates project toward and terminate at the flanges of plate 27 as best shown in Fig. 6. The stiffener plates 30 are also welded to the web of plate 27. Six vertically disposed gusset plates 31 are positioned upon the web of the plate 26 and are welded to the web and are arranged in radially spaced relation around the tube 29 and one end of each of the gusset plates is welded to the tube and two of the gusset plates project toward and terminate at a location adjacent the nonflanged edges of the web of the plate 26 as best shown in Figs. 2 and 3. The other gusset plates 31 project toward the flanges on the plate 26 and terminate at locations spaced from the flanges and a pair of reinforcing plates 32 are welded to the opposite faces of each of these plates at the outer ends of the plates. Each gusset plate 31 is in vertical alignment with one of the six stiffener plates 30. An internally threaded sleeve 33 is disposed in the upper end of the tube 29 and has a flange bearing upon the upper end of the tube and the sleeve is welded to the tube. Angles 34 extend longitudinally of the plate 26 adjacent the flanges of the plate and have their horizontal flanges welded to the web of the plate as best shown in Figs. 3 and 6.

A block 35 is positioned adjacent each corner of the web of plate 26 and is welded to the lower face of the web and each block has a threaded opening and each opening is in alignment with a similar opening in the web of the plate as best shown in Fig. 4. Metal strips 36 extend along the nonflanged edges of the web of the plate 26 and these strips extend the full width of the plate and are welded to the adjacent blocks 35 and to the flanges of the plates 26 and 27 as best shown in Fig. 3. A plate 37 is positioned against each block 35 and extends from the adjacent flange on plate 26 to the adjacent flange on plate 27 and each plate 37 is welded to the web of plate 26 and to the adjacent block. A pair of spaced brackets 38 are disposed adjacent each block 35 and are welded to the web of plate 26 and each bracket has a notch extending inwardly from its bottom edge and a clip 39 extends along the bottom edge and the two adjacent edges of each bracket and is secured to the bracket by screws as best shown in Fig. 4. The notch in each bracket 38 and the adjacent clip 39 together form a vertically extending slot 40. A wheel is mounted in each pair of brackets 38 and each wheel is comprised of a roller 41 and a rib 42 extending around the roller intermediate the ends of the roller and pins 43 integral with the ends of the roller as best shown in Fig. 6. The pins 43 on each wheel are rotatably and slidably disposed in the slots 40 formed by brackets 38 and clips 39. The rib 42 on each wheel is adapted to be disposed between the adjacent pair of rails 19 or 20 and the roller 41 on each wheel is adapted to roll upon the adjacent pair of rails. A pair of spaced leaf springs 44 are positioned under the web of plate 26 at each side of the stand 18 and these springs extend longitudinally of the stand. A block 45 has two spaced slots and each pair of springs 44 are supported in these slots midway of the length of the springs and bolts 46 extend through the web of plate 26 and the block to secure the springs to the plate. Each pair of springs 44 bear upon a pair of wheels and one end of one spring bears upon the roller 41 on one wheel on one side of its rib 42 and the adjacent end of the other spring bears upon the same roller on the same wheel on the other side of the rib and the other ends of each pair of springs bear upon the roller on the other wheel on opposite sides of the rib on that wheel. Each pair of springs 44 urge their respective pair of wheels downwardly in the slots 40 and away from the stand 18. A securing element or screw 47 is in threaded engagement with the opening in each block 35 and extends through the adjacent opening in the web of the plate 26 as best shown in Fig. 4. Each screw 47 has a head on one end and a washer is disposed on the screw and bears against the head. Each screw 47 has its threads intermediate its ends and a groove extends around the screw adjacent its free end and the free end of the screw is square so that a tool may be used to turn the screw. Each screw 47 is disposed between the adjacent pair of rails 19 or 20 and the head of the screw is adapted to engage the adjacent flanges on the adjacent pair of rails. A snap ring is placed in the groove in each screw 47 and prevents the screw from being unthreaded from the adjacent block 35.

A vertically disposed bar or jack screw 48 is in threaded engagement with the sleeve 33 and the portion of the screw contiguous with its upper end is smooth and larger than the threaded portion of the screw as best shown in Figs. 2 and 5. The jack screw 48 is provided with a circular recess 49 in the center of its top and a plurality of radially spaced grooves 50 are provided in the top and extend from the periphery of the smooth portion of the screw to the recess. A plurality of radially spaced bosses remain after the recess 49 and the plurality of grooves 50 have been cut out of the top of the screw 48. The smooth portion of the screw 48 has a groove extending therearound which is spaced from the top of the screw and a snap ring 51 is placed in the groove. A locking ring 52 is rotatably mounted on the smooth portion of the screw and seats upon the snap ring 51. The locking ring 52 is provided with a plurality of spaced slots 53 and each of the slots extends from a location adjacent the outer periphery of the ring toward the inner periphery of the ring as best shown in Figure 3. A locking dog 54 is positioned in each of the grooves 50 in the top of the screw 48 and the inner end of each dog is in the shape of a segment of a circle and the outer end of each dog has its corners cut away. A pin 55 is pressed in a recess adjacent the outer end of each dog and the pin is adapted to project into the adjacent slot 53 in the locking ring 52. A pair of spaced metal pieces are welded to the lower face of the locking ring 52 and one end of a handle 56 is positioned between the metal pieces and a pin extends through the metal pieces and the handle to pivotally connect the handle to the ring. An extension 57 is made integral with the handle 56 and the extension has a blade thereon which is adapted to project into a depression spaced below the top of the screw 48 in the periphery of the smooth portion of the screw. A circular guide plate 58 is positioned upon the bosses on the top of the screw 48 and the plate has a vertically extending flange therearound which terminates at a position opposite the locking ring 52. The guide plate 58 has a central opening for the passage of the fifth wheel pin 21. Machine screws 59 extend through the plate 58 and are in threaded engagement with holes in the bosses at the top of the screw 48. The plate 58 keeps the dogs 54 from coming out of the grooves 50 in the screw 48 when the locking ring 52 is rotated.

After the trailer 11 has been backed into engagement with the projections 16 on the support 17 with its front end still being supported by the lift truck the fifth wheel stand 18 is moved on the tracks 19 and 20 longitudinally of the car until it is directly under the fifth wheel pin 21 on the trailer. The handle 56 is then pivoted toward the screw 48 until the extension 57 on the handle projects into the depression and the handle is moved in a radial direction to move the screw upwardly or downwardly in the sleeve 33 until the height of the stand 18 is at the elevation desired. The lift truck then lowers the front end of the trailer so that the fifth wheel pin 21 seats in the recess 49 in the top of the screw. The handle 56 is then pulled away from the screw 48 and moved around the screw in a clockwise direction as shown in Figure 3 to rotate the ring 52 in a clockwise direction and since the pins 55 must ride in the slots 53 in the ring toward the inner periphery of the ring the dogs 54 move inwardly of the screw into a circular groove 60 in the fifth wheel pin 21 and prevent vertical movement of the front end of the trailer 11. When the trailer is lowered onto the stand the weight of the trailer forces the web of plate 27 against plate 23 on the car against the force of the leaf springs 44 and the pins 43 on the wheels move upwardly in their slots 40. The screws 47 are then rotated by applying a tool to their square ends causing the heads on the screws to engage the adjacent flanges on the adjacent pair of rails 19 or 20 to hold the stand 18 in a fixed or stationary position. The friction between the web of plate 27 and plate 23 on the car also helps hold the stand 18 in a fixed position. The trailer 11 is now ready to be transported on the flat car.

To unload the trailer 11 from the car the handle 56 is turned in a counterclockwise direction as viewed in Figure 3 to move the dogs 54 outwardly of the groove 60 in the fifth wheel pin 21 to release the pin. A lift truck then lifts the front end of the trailer 11 so that the fifth wheel pin 21 clears the stand 18. The lift truck then moves the trailer 11 forwardly of the car so that the trailer is disengaged from the projections 16 on the support 17. The lift truck then backs off the car onto the platform swinging the front end of the trailer 11 off the car onto the platform with the wheels at one side of the trailer pivoting with the turntable 14 and then moves the trailer 11 entirely off the car.

The trailer 12 may be loaded from the platform on the other side of the car and four of its wheels are directed onto a turntable 61 and the front end of the trailer is swung onto the car and then the trailer is backed into engagement with the projections on a support 62 at the center of the car. The front end of the trailer is lowered into engagement with the fifth wheel stand 63 which is slidable on two pairs of T-shaped rails which extend longitudinally of the car. The fifth wheel stand 63 is identical with the fifth wheel stand 18. The trailer 12 is unloaded in a manner similar to the trailer 11. An end wall 64 is provided to prevent the lift truck from accidentally going off the car while loading or unloading the trailer 12.

The arrangement shown in Figs. 9 and 10 is the same as in the previous figures except that the guide plate 58 has been removed and an inverted horizontally disposed channel 65 has been substituted for the guide plate. The channel 65 has its web positioned upon the bosses on the top of the jack screw 48 and the same screws 59 extend through the web of the channel and are threaded into holes in the bosses. The web of the channel 65 has an opening therein to receive the fifth wheel pin 21 on the trailer 11 and the bottom of the trailer is adapted to rest upon the web of the channel. The web of the channel 65 also keeps the dogs 54 from jumping out of the grooves 50 in the screw 48 when the locking ring 52 is rotated. Each flange of the channel 65 is reflanged so as to form a horizontal central portion and two sloping portions and the horizontal central portions are located approximately at the top of the sleeve 33.

From the foregoing it will be seen that there has been provided a stand which is movable longitudinally of a freight vehicle so that it may be positioned under the shipped vehicle and is vertically adjustable according to the height of the shipped vehicle and prevents vertical, transverse or longitudinal movement of and supports the shipped vehicle while in transit.

What is claimed is:

1. In a freight vehicle adapted to carry a truck trailer having a fifth wheel pin provided with a groove extending therearound, a floor, a vertically disposed stand mounted on the floor and having internal threads, a vertically disposed jack screw having a smooth bar portion from its top to a location spaced from its top and external threads from said location to its bottom and in threaded engagement with the threads in the stand and provided with a recess in the center of its top and a plurality of radially spaced grooves in the top extending from its periphery to the recess and a depression in the periphery spaced below the top, a locking ring rotatably mounted on the bar portion of the screw and provided with a plurality of spaced slots and each of the slots extending from the outer periphery of the ring toward the inner periphery thereof, a locking dog positioned in each of the grooves in the top of the screw, a pin fixedly secured to each dog and adapted to project into the adjacent slot in the ring, a handle pivotally connected to the ring, and an extension integral with the handle, the handle being adapted to be pivoted toward the screw until the extension projects into the depression and being adapted to be moved in a radial direction to move the screw upwardly or downwardly in the stand to a position adjacent the fifth wheel pin on the trailer and the fifth wheel pin being adapted to seat in the recess in the screw and the handle being adapted to be moved around the screw in one direction to move the ring and cause the dogs to move inwardly of the screw into the groove in the fifth wheel pin and the handle being adapted to be moved around the screw in the opposite direction to move the ring and cause the dogs to move toward the periphery of the bar portion of the screw and release the fifth wheel pin.

2. In a freight vehicle adapted to carry a vehicle, a floor, a first pair of spaced rails positioned longitudinally of the freight vehicle and secured to the floor, a second pair of spaced rails positioned longitudinally of the freight vehicle and spaced from the first pair of rails and secured to the floor, a vertically disposed stand adapted to partially support the vehicle, a pair of wheels rotatably mounted on each side of the stand and each wheel comprising a roller and a rib extending around the roller intermediate its ends and the rib on each wheel being disposed between the adjacent pair of rails and the roller on each wheel being disposed upon the adjacent pair of rails, the stand being movable longitudinally of the freight vehicle with its wheels rolling on the rails so that it may be positioned under the vehicle, and means mounted on each side of the stand and adapted to engage the adjacent pair of rails to hold the stand in a fixed position after it has been placed under the vehicle.

3. In a freight vehicle adapted to carry a vehicle, a floor, a pair of spaced rails positioned longitudinally of the freight vehicle and secured to the floor, a stand adapted to partially support the vehicle and provided with a plurality of vertically extending slots, wheels rotatably and slidably mounted in the slots in the stand, springs secured to the stand and engaging the wheels and urging them downwardly in their slots, and means mounted on the stand, the stand being movable longitudinally of the freight vehicle with the wheels rolling on the rails so that it may be positioned under the vehicle and the weight of the vehicle forcing the stand downwardly relative to the wheels in their slots against the force of the springs and the means being adapted to be engaged with the rails after the vehicle has been placed on the stand to hold the stand in a fixed position.

4. In a freight vehicle adapted to carry a vehicle, a floor, a pair of spaced rails positioned longitudinally of the freight vehicle and secured to the floor, a vertically disposed stand provided with a plurality of vertically extending slots and adapted to partially support the vehicle, and a pair of rail engaging mechanisms mounted on opposite sides of the stand and each mechanism comprising a pair of wheels rotatably and slidably mounted in the slots in the stand and a spring secured to the stand and the spring bearing upon the wheels and urging the wheels downwardly in their slots away from the stand and a securing element positioned adjacent the pair of wheels and mounted on the stand, the stand being movable longitudinally of the freight vehicle with its wheels rolling on the rails so that it may be positioned under the vehicle, the weight of the vehicle forcing the stand downwardly relative to the wheels in their slots against the force of the adjacent spring and each securing element being adapted to be moved after the vehicle has been placed on the stand causing the adjacent securing element to engage the adjacent rail to hold the stand in a fixed position.

5. In a freight vehicle adapted to carry a vehicle, a floor, a pair of spaced rails positioned longitudinally of the freight vehicle and secured to the floor, a vertically disposed stand provided with a plurality of vertically extending slots and adapted to partially support the vehicle, and a pair of rail engaging mechanisms mounted on opposite sides of the stand and each mechanism comprising a pair of wheels rotatably and slidably mounted in the slots in the stand and a spring secured to the stand and the spring bearing upon the wheels and urging the wheels downwardly in their slots away from the stand and a pair of securing elements positioned adjacent the pair of wheels and mounted on the stand, the stand being movable longitudinally of the freight vehicle with its wheels rolling on the rails so that it may be positioned under the vehicle, the weight of the vehicle forcing the stand downwardly relative to the wheels in their slots against the force of the adjacent spring and the pairs of securing elements being adapted to be moved after the vehicle has been placed on the stand causing the elements to engage the adjacent rail to hold the stand in a fixed position.

6. In a freight vehicle adapted to carry a vehicle, a floor, a pair of spaced rails positioned longitudinally of the freight vehicle and secured to the floor, a vertically disposed stand provided with a plurality of vertically extending slots and adapted to partially support the vehicle, and a pair of rail engaging mechanisms mounted on opposite sides of the stand and each mechanism comprising a pair of wheels rotatably and slidably mounted in the slots in the stand and a pair of springs secured to the stand and the springs bearing upon the wheels and urging the wheels downwardly in their slots away from the stand and a pair of securing elements positioned adjacent the pair of wheels and mounted on the stand, the stand being movable longitudinally of the freight vehicle with its wheels rolling on the rails so that it may be positioned under the vehicle, the weight of the vehicle forcing the stand downwardly relative to the wheels in their slots against the force of the adjacent pair of springs and the pairs of securing elements being adapted to be moved after the vehicle has been placed on the stand causing the elements to engage the adjacent rail to hold the stand in a fixed position.

References Cited in the file of this patent

UNITED STATES PATENTS

| | | |
|---|---|---|
| 1,271,812 | Wagner | July 9, 1918 |
| 1,387,544 | Hibbard | Aug. 16, 1921 |
| 2,034,893 | Butterworth | Mar. 24, 1936 |
| 2,036,344 | Menhall | Apr. 7, 1936 |
| 2,099,288 | Allen | Nov. 16, 1937 |
| 2,159,479 | Goodwin et al. | May 23, 1939 |
| 2,170,581 | West et al. | Aug. 22, 1939 |
| 2,204,667 | Dooley et al. | July 18, 1940 |
| 2,444,637 | Dietrichson | July 6, 1948 |
| 2,503,368 | Willetts | Apr. 11, 1950 |
| 2,664,611 | Shomber | Jan. 5, 1954 |

FOREIGN PATENTS

| | | |
|---|---|---|
| 454,878 | Great Britain | Oct. 9, 1936 |

OTHER REFERENCES

"Railway Age," page 18, Nov. 23, 1953.